L. S. BALUTA.
RECORDER AND REGISTER FOR DISPENSING APPARATUS.
APPLICATION FILED SEPT. 14, 1917.
1,358,921.
Patented Nov. 16, 1920.
3 SHEETS—SHEET 1.
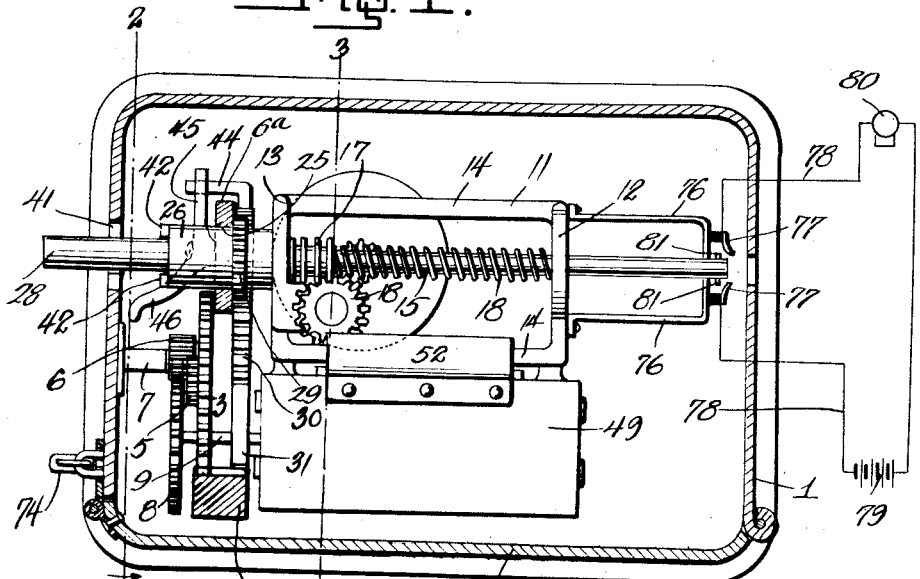
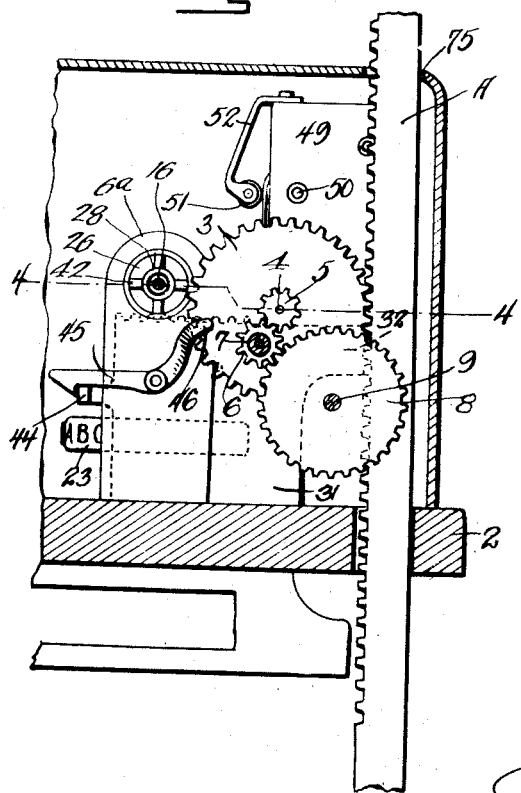
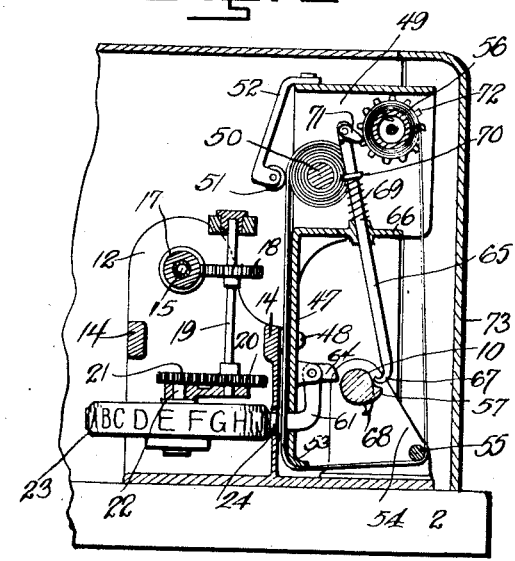
Inventor
Leonard S. Baluta
By Lancaster and Allwine
his Attorney L. S. BALUTA.
RECORDER AND REGISTER FOR DISPENSING APPARATUS.
APPLICATION FILED SEPT. 14, 1917.
1,358,921.
Patented Nov. 16, 1920.
3 SHEETS—SHEET 2.
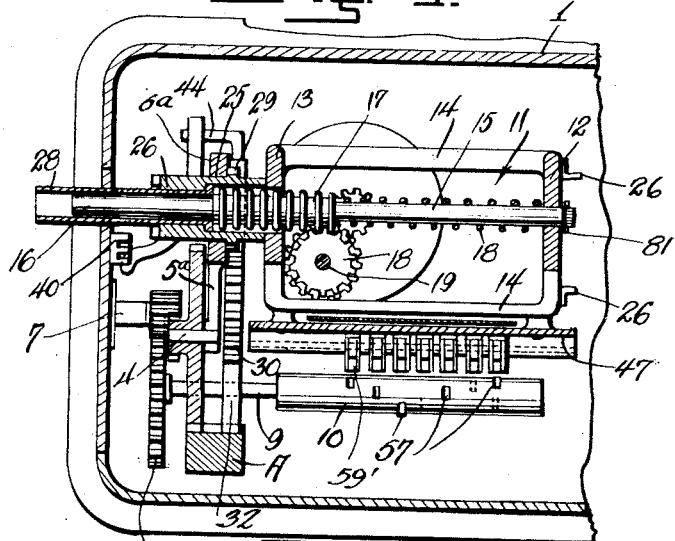
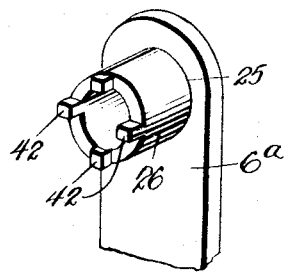
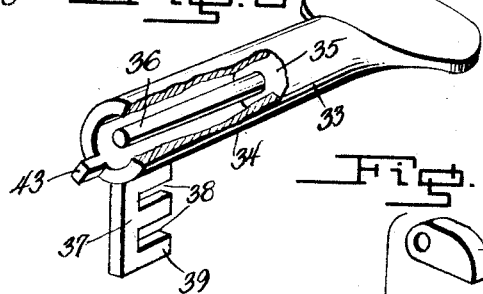
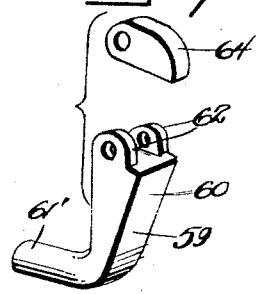
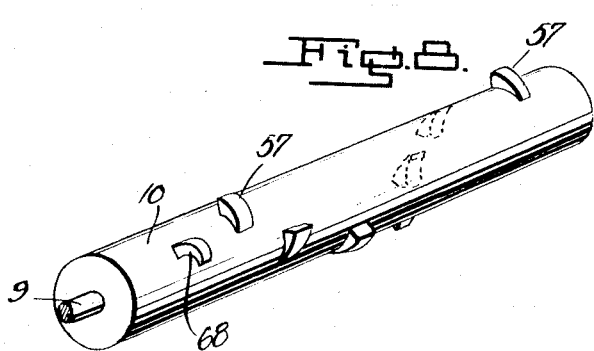
Inventor
Leonard S. Baluta
By Lancaster and Allwine
his Attorneys

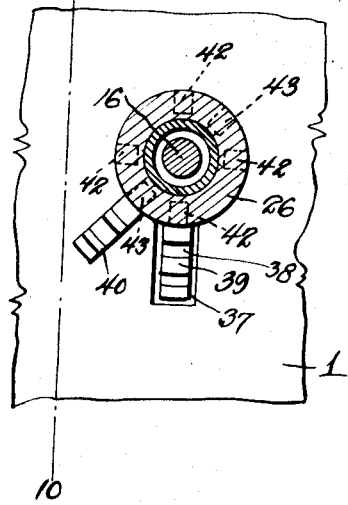
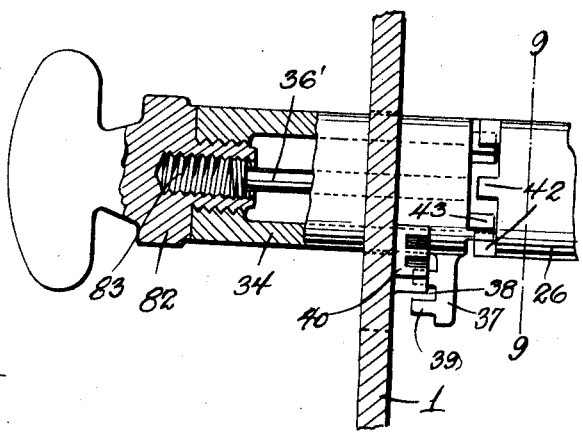
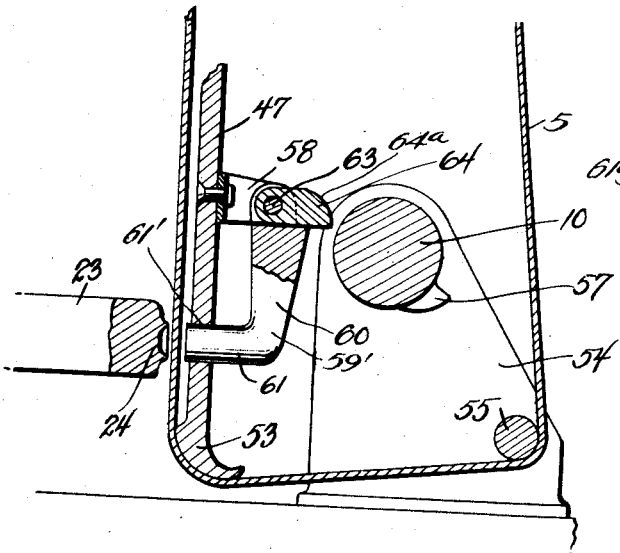
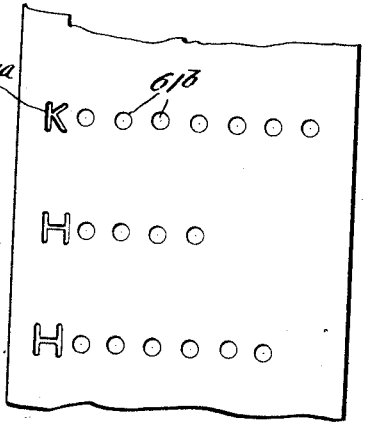

UNITED STATES PATENT OFFICE.

LEONARD S. BALUTA, OF ROARING CREEK, PENNSYLVANIA.

RECORDER AND REGISTER FOR DISPENSING APPARATUS.

1,358,921.  Specification of Letters Patent.  Patented Nov. 16, 1920.

Application filed September 14, 1917. Serial No. 191,396.

*To all whom it may concern:*

Be it known that I, LEONARD S. BALUTA, residing at Roaring Creek, in the county of Columbia and State of Pennsylvania, have invented certain new and useful Improvements in Recorders and Registers for Dispensing Apparatus, of which the following is a specification.

This invention relates to recording and registering apparatus and more particularly to an improved device for use in connection with gasolene dispensing apparatus.

The primary object of the invention is to provide a device of this character that may be associated with the ordinary mechanical dispensing apparatus commonly used in garages and at wayside supply stations for the purpose of accurately recording the quantity of gasolene dispensed while, at the same time, properly registering, through the medium of predetermined characteristics, the employees or persons operating the device when the gasolene is dispensed.

A further object of the invention is to provide a compact recorder and register of this character that will be semi-automatic in operation and will require no attention by the owner of the gasolene, who may be assured that unscrupulous persons or employees cannot remove any of the gasolene without the same being recorded by the device.

The invention also aims at the provision of a recorder and registering device which may be operated by any or all of the duly authorized employees, each of whom will possess an operating element in the form of a key which, when properly used, will connect the registering device to register the quantity of gasolene dispensed while, at the same time, certain distinguishing indicia will permanently establish the identity of the employee upon each operation of the machine.

The invention further aims at the provision of a recording and registering device adapted to employ rolls of tape or paper upon which the quantity of gasolene and also the identity of the employee dispensing the same will be duly recorded for future reference and for assuring the owner that the gasolene is being properly and legitimately dispensed.

Further objects and advantages of the invention will be readily apparent from a consideration of the detailed description of the present preferred form of the invention, illustrated in the accompanying drawing in which:

Figure 1 is a plan view of the device, the casing therefor being shown in section and the electrical portion in diagram.

Fig. 2 is a fragmentary section on the line 2—2 of Fig. 1.

Fig. 3 is a fragmentary transverse section taken substantially on the line 3—3 of Fig. 1.

Fig. 4 is a fragmentary horizontal section taken approximately on the line 4—4 of Fig. 2.

Fig. 5 is a detail perspective view of a portion of the invention.

Fig. 6 is a detail perspective view of the operating key.

Fig. 7 is a perspective view of the detail of the invention.

Fig. 8 is a perspective view of the punch actuating roller.

Fig. 9 is a fragmentary section taken on the line 9—9 of the succeeding figure.

Fig. 10 is a section on the line 10—10 of Fig. 9.

Fig. 11 is a detail fragmentary enlarged section of the punching mechanism.

Fig. 12 is a detail fragmentary view of the record made by the recording mechanism.

Referring to the drawings, wherein is illustrated the preferred form of my invention and in which like characters of reference indicate the corresponding parts throughout the several views, a housing 1 is constructed of suitable size and is permanently fixed to a base 2 which may be arranged in any convenient manner on any type of dispensing apparatus although, it will be understood, that the device is more especially designed for use with the modern type of gasolene dispensing devices now generally employed in garages, supply stations, and roadside emergency stations.

The rack bar A indicates the usual rack bar commonly employed on devices of this character which are actuated by a suitable mechanism for reciprocating pump pistons designed to dispense a predetermined quantity of liquid upon each reciprocation of the rack bar. In mesh with the teeth on the rack bar is a relatively large gear 3 mounted on a stud shaft 4, the latter being supported by an arm $5^A$ integrally formed with an upright standard $6^A$ carried by the base. The end of the stud shaft 4 carries a small pinion 5 in mesh with another small pinion 6, mounted on a second stud shaft supported by a bearing sleeve 7 fixed to the top side wall of the housing as shown in detail in Figs. 1 and 4 of the drawing. The pinion 6 is in mesh with a driving gear 8, fixed to a shaft 9 projecting considerably beyond one end of a roller 10, shown in detail in Fig. 8, of the drawing. This said train of gears including the gears 3 and 8 and the pinions 5 and 6, is so proportioned that the roller 10 will have one revolution upon each complete reciprocation of the rack bar A.

A supporting frame 11 is mounted on the base and includes the end standards 12 and 13 arranged in longitudinally spaced relation and connected by the side bars 14. As shown in Fig. 4, the supporting standard 13 is provided with an opening through which a shaft 15 is projected. This shaft 15 consists of the two relatively small ends, one of which forms a guide rod 15 while the opposite end provides a push rod 16. Substantially intermediate the ends of this shaft, the same is increased in diameter and is provided with a series of longitudinally spaced annular ridges 17, which slide freely through the opening in the standard 13. One end of this enlarged portion forms a shoulder against which a coil compression spring 18 operates, while the opposite end of the spring engages the standard 12 to normally urge the annular ridges 17 through the opening in the standard. This enlarged portion of the shaft with the ridges 17 form an actuating element adapted to mesh with a gear 18 mounted on a vertically disposed shaft 19, the ends of which are suitably journaled in suitable bearings as shown in Fig. 3 of the drawing. Near the lower end of this shaft is a gear 20 in mesh with a smaller gear 21 on the end of a stud shaft 22 fixed to a recording disk 23. The disk 23 has its marginal edge provided with circumferentially spaced characters, which, in this instance, are shown as the letters of the alphabet. As shown to advantage in Fig. 11, these characters are raised out from or embossed on the marginal surface of the disk 23, as indicated at 24, so that an impression of the letter will be made upon any soft material coming in firm contact with the raised letter.

The upright standard 6^A is provided with a relatively large opening 25 through which an actuating sleeve 26 is projected, and this sleeve has one end interiorly recessed to receive the actuating element 17. The opposite end of the sleeve 26 has a relatively small longitudinal opening 27 into which is slidably fitted an operating sleeve 28, the end of which has a flange fitting in the interiorly recessed end of the sleeve and engageable with the shoulder formed by the proximate end of the actuating element 17.

As shown in Fig. 4, the operating or push rod 16 is disposed within the operating sleeve 28 and both the sleeve and the rod are projected through a large aperture 41 in the side of the housing 1. The sleeve 26 is freely rotatable in the opening 25 and on the inner surface of the standard 6^A is a gear 29 integrally formed with the sleeve 26 and rotatable therewith. The teeth of the gear 29 are in mesh with the teeth 30 on a locking bar 31 which has one end provided with a tongue 32, the terminal of which has teeth adapted to mesh with the teeth on the rack bar A. It is to be observed that the tongue 32 projects over and above the shaft 9 so that the rack bar A may be unlocked by reciprocation of the lock bar 31, which will cause disengagement of the teeth of the lock bar from the teeth of the rack bar A.

To actuate the disk 23 simultaneously with the unlocking of the lock bar 31, I have provided an operating key 33, one form of which is shown in detail in Fig. 6 of the drawing. The key barrel 34 has a hollow cylindrical interior which terminates in an end wall 35. Centrally located within the hollow interior and fixed to the end wall 35 is a push rod 36 which will coöperate with the push rod 16 when the key is placed into operated position. This barrel 34 has a projecting leaf 37 transversely slotted as at 38, for forming a series of nibs 39, the purpose of which will be presently described. On the side wall of the housing, at the interior thereof, is a baffle leaf 40 disposed diagonally as shown in Fig. 9. This leaf is also slotted for permitting passage of the nibs 39 when the key is rotated and, therefore, it will be obvious that only one type of leaf 37 may be employed with the device. Any attempt, by an unscrupulous person, to use a key having a leaf of a different type will be frustrated since the nibs of the key will not pass the baffle plate 40.

The large opening 41 in the side of the housing, through which the sleeve 28 and the rod 16 project, is large enough to receive the end of the barrel of the key and this wall also has a square aperture for the reception of the leaf 37, as shown to advantage in Fig. 9 of the drawing.

The end of the sleeve 26 is provided with projecting lugs 42 arranged at diametrically opposite points and adapted to engage similar lugs on the end of the barrel 34 of the key. As shown clearly in dotted lines in Fig. 9, the lugs 42 on the end of the sleeve 26, are four in number equally spaced apart and when in normal position, are arranged in pairs vertically and laterally spaced apart. When the end of the key is thrust through the opening 41, the lugs 43 on the end of the key will be disposed, as shown in dotted lines in Fig. 9, while the leaf 37 will project through the slot beneath the opening 41. By pressing inwardly on the key, the end of the push rod will engage the push rod 16 and thrust the same inwardly thereby causing the actuating element 17 to impart a rotary motion to the gear 18, which in turn, through the gears 20 and 21, will rotate the disk 23. The length of the push rod 36, of course, will govern the distance which the key may be thrust inwardly and consequently the movement of the disk 23 will be correspondingly governed, so that the proper indicia will be moved and stopped in the proper position as will presently appear. When thus thrust inwardly, the lugs 43 on the end of the key, will engage the lugs 42 and it will be obvious that the rotary movement imparted to the key will rotate the sleeve 26, which in turn will rotate the gear 29 for moving the lock bar 31 for disengaging the teeth of the tongue 32 from the teeth of the rack bar A thereby unlocking the latter to permit reciprocation of the same.

A supplemental locking element is provided for the locking bar 31 for the purpose of preventing movement of the locking bar before the key is placed in position and actuated. This supplemental locking element consists of a laterally projecting arm bent at right angles to form a finger 44. Pivotally mounted upon the standard 6, as shown to advantage in Fig. 2, is a locking lever 45, one end of which forms a latch to engage the finger 44, while the opposite end provides a trip 46, having its terminal disposed in a position whereby it may be engaged by the edge of the leaf 37 of the key when the latter is turned. In this manner, the latch may be disengaged from the finger 44 when the key is rotated just prior to the rotation of the sleeve, which latter action unlocks the locking bar 31. This is due to the position of the contacting lugs 42 and 43, as shown in Fig. 9, they being so disposed that a movement of the leaf 37 of the key is permitted before the lugs come in contact for rotating the sleeve 26.

A removable frame is releasably fixed to the bar 14, and includes a plate 47 fastened by screws 48 to the bar 14. A roller housing 49 is carried by the plate 47, and is adapted to receive a supply roller 50, upon which is wound a quantity of tape or paper for permanently receiving the indicia indicating the recorded and registered characters. The ends of this roller 50 are journaled in the side walls of the housing so that the paper may be freely drawn from the roller as desired, and to prevent loosening of the paper, I have provided a retaining or idler roller 51, held by a resilient plate 52 in contact with the paper on the roller 50. The lower edge of the plate 47, as shown to advantage in Fig. 11 of the drawing, is provided with a lip 53, under which the paper is trained. An auxiliary support 54 is mounted upon the main support 2 and carries a small roller 55, under which the paper is trained to pass upwardly over a takeup roller 56 which receives the tape or paper after the characters have been properly impressed therein. The ends of the punch actuating roller 10 are journaled in this auxiliary support 54, and it is to be noted that this roller has a series of spirally arranged lugs 57 equally spaced apart. By following out the spiral continuity of the lugs 57, it will be noted that the endmost lugs are disposed at substantially the same circumferential point on the roller 10 except for their longitudinally spaced position. It is apparent, therefore, that a complete revolution of the roller will cause each of the lugs 57 to contact with any abutment or projection in their circular part. As shown in detail in Fig. 11 of the drawing, the plate 47 carries a series of supporting brackets 58 equally spaced apart. The bracket 58 which is nearest the rack A pivotally supports a striker 59' and this striker is adapted to coact with the indicia embossed upon the periphery of the disk 23 for making an intaglio of the indicia in the portion of the paper strip or tape which is positioned in alinement with the embossed indicia 24. This striker 59' is substantially identical in construction with the puncher 59, and these punches and the striker each consist of a shank 60 having a laterally projecting portion 61 in register with apertures 61' formed in the plate 47. As shown in Fig. 11, the paper strip is extended downwardly between the disk 23 and the finger 61 of the striker 59' and the puncher 59 and when the end of this finger or portion 61 of the striker 59' is brought or moved sharply into engagement with the paper the character or indicia 24 which alines with the striker will be impressed in the paper as shown in Fig. 12 of the drawings, at 61^A, while when the punch fingers or arms 61 are brought sharply into engagement with the paper they will punch therethrough, making openings in the paper as indicated at 61^B in Fig. 12 of the drawing.

The shanks 60 of the striker 59' and puncher 50 have spaced ears 62 formed upon their upper ends and these ears are perforated to receive the pivot pin 63 which pivotally supports the striker and each of the punchers. Spaced between the ears 62 of each of the punchers and also of the striker is a pawl, or tongue 64, the lower surface of which is adapted to engage the upper end of the shank 60 to rock either the striker or the puncher, depending upon the one which is engaged by the pawl to operate these members and to move them into engagement with the paper, through their respective openings 61'. Each tongue or pawl 64 is disposed in the path of movement of the one of the lugs 57 on the roller 10 and when the roller is rotated, as previously described, the lug corresponding to each respective tongue or pawl 64 will strike the upper surface of the curved end 64^A of the pawl or tongue, forcing it downwardly and rocking the punch or striker which is engaged by the tongue acted upon or moved by the rotation of the roller 10 to cause the striker or punch to properly make its indicia upon the paper strip.

When the roller 10 is rotated, the lugs 57 will successively engage the pawl or tongue 64 for operating the striker 59 and the various tongues for operating the puncher in rotation, and since the lugs 57 are spaced upon the roller 10 in such position to be moved into engagement with their respective pawls 64 upon the dispensing of a predetermined quantity of liquid by the operation of the rack bar, the number of puncher operated and the number of perforations 61^B in the record or paper strip will indicate the quantity of liquid dispensed by each operation of the pump structure. For example, the first row of indications in Fig. 12 shows the letter K impressed in the paper and this letter is an intaglio of the character 24 which has been moved into alinement with the striker 59' by the rotation of the disk 23 and upon the operation of the tongue, this striker is initially operated to indicate the person or employee dispensing the liquid from the pump upon that operation. The first record shows seven holes punched in the record or paper and if the lugs 57 were positioned, for example, to make the mark upon the dispensing of a gallon of the liquid, this record would show that the employee who is indicated by the letter K had upon that operation of the pump dispensed seven gallons of liquid, while the second record shown in this figure would show that the employee indicated by the letter H had dispensed four gallons of liquid from the pump at one operation and the succeeding operation he had dispensed a slightly greater amount, thereby with the use of the improved register and recorder, each operation of the pump would be indicated upon the record, also the number of gallons dispensed at the said operation and the person dispensing the same.

The character 61^A on the record is regulated by means of the push pin 36, and the key 33, as previously described. By spirally longitudinally spacing the lugs 57, any quantity of gasolene may be immediately registered, and it will be obvious that by providing a greater number of lugs or spacing them differently, any quantity of gasolene may be registered on the paper strip and thus be permanently recorded.

To take up the paper on the receiving roller 56 after it has passed beneath the roller 55, I have provided a sliding rod 65 slidably supported in a bearing formed on the shelf 66. The lower end of this rod is provided with a hook 67 adapted to be engaged by a tang 68 projecting from the roller 10. When this roller 10 rotates, the tang 68 engages the hook 67 and draws the latter downwardly against the tension of a coil expansion spring 69 interposed between the end of the bearing in the shelf 66 and a collar 70 on the rod. A pawl 71 is pivotally carried by the upper end of the rod 65 and is spring pressed to project outwardly for engagement with any one of the teeth 72 carried by the ratchet wheel, fixed to the roller 56. The ends of this roller are journaled in the housing 49 so that it may be freely rotated and it will be obvious that when the roller 10 rotates, and the tang 68 holds the rod 65 downwardly, the pawl 71 will engage one of the teeth of the ratchet wheel and rotate the roller 56 to take up the paper strip.

The front of the housing 1 is provided with a hinged closure 73 locked by a padlock 74 or the like, and adapted to be swung to open position for permitting the insertion of a new roll of paper on or removing the used paper from the roller 56. A convenient slot 75 in the closure at the top thereof, permits the closure to swing over the front of the housing without interfering with the reciprocation of the rack bar A.

It will be desirable that the proprietors of the establishments in which the device is installed, shall know of each operation of the device, and for this purpose I have provided an audible signal adapted to be electrically operated upon each operation of the device. Projecting laterally from the supporting standard 12 is a pair of arms 76, carrying contact points 77 at their terminals and these contact points are electrically connected to conductors 78 which are in circuit with a suitable source of current 79 in the form of batteries or the like. An audible signal bell or buzzer 80 is also electrically connected in the circuit, and when the guide rod 15 is pushed outwardly upon the operation of the key, the circuit will be closed across the two contact points 77 by virtue of the laterally projecting contact pins 81, carried by and insulated from the end of the guide rod 15. This signal may be arranged at any convenient point so that it will be audible to the proprietor or person in charge and he may thus determine each actuation of the recording and registering mechanism.

In Fig. 10 of the drawing, I have illustrated a slightly modified form of the key, and it will be noted that the barrel 34 is screw-threadedly mounted on the head 82, which latter has an internally screw-threaded recess 83 for receiving the screw-threaded end of the adjustable push rod 36'. The barrel 34 is an exact duplicate of the barrel 36 in the above described form of key and registers with the baffle leaf 40 when the key is rotated. With this form of key, the push rod 36 may be longitudinally adjusted to regulate the inward path of the push rod 16, thus correspondingly regulating the rotary movement of the disk 23. A number of these keys may be differently adjusted and used by different employees thus assuring the registration of a different character upon the operation of the device by the different employees or authorized persons.

Summing up, generically the operation of the improved register and recorder is as follows: When it is desired to operate the rack bar 8 of the pump structure to dispense liquid, it is necessary for the operator thereof to insert his key through the opening 41 into the casing and in inserting his key the barrel 34 thereof will engage about the sleeve 28 while the push pin 36 will engage the push pin 16 and move this pin, longitudinally and rotate the disk 23, in a manner above specifically set out to position the indicia embossed thereon corresponding to his name or number into alinement with the striker 59'. The movement of the disk 23 is regulated by the length of the push pin 36 carried by the key. Rotation of the key 33, will operate the locking mechanism, to permit the rack bar A to be reciprocated for dispensing the liquid. The reciprocating of the rack bar A will be imparted to the roller 10, through the medium of the train of gears and the shaft 9. The initial movement of the rack bar will rotate the roller 10 sufficiently to operate the bar 65 to move the strip of paper sufficient distance to make a new record thereon and immediately after the movement of the strip of paper, the lug 57 will engage the pawl 64 of the striker structure 69' and operate this striker moving it sharply into engagement with the paper and forcing the latter against the embossed indicia 24, causing an intaglio of the said indicia to be made in the paper. Further operation of the rack bar A will rotate the roller 10, and bring the various lugs 57 successively into engagement with the pawl 64 of the punch structure, successively operating these punch structures, to perforate the paper strips, corresponding to the number of predetermined quantity of liquid dispensed.

It will be noted that the lugs 57 have their outer surfaces arcuated and extending tangentially from the periphery of the roller 10 so as to permit these lugs upon the reverse rotation of the roller 10, caused by the movement of the rack bar A to its original or normal position to strike the under surface of the pawls or tongues 64 and rock them upwardly permitting them to move upon the pivot pins 63, idly and without imparting movement to their respective punches or to the striker.

From the foregoing, it will be observed that a very simple and durable recording and registering device has been provided, the details of which embody the preferred form. I desire to be understood, however, that slight changes may be made in the details of construction without departing from the spirit of the invention or the scope of the claims hereunto appendant.

What is claimed is:

1. A recording and registering device comprising, in combination with a reciprocatory rack bar, recording means normally locked in engagement with the rack bar, and key operated registering means simultaneously operated with the said recording means when released from the locked position with the said rack bar.

2. A recording and registering device comprising, in combination with a reciprocatory rack bar, recording means normally locked by the said rack bar, key operated registering means associated with the said recording means and normally locked in engagement with the said rack bar and adapted to be simultaneously operated with the said recording means when the said first mentioned registering means is released.

3. In a recording and registering device, the combination with a reciprocatory rack bar, a source of paper supply, a roller provided with a series of longitudinally spaced lugs, gearing in registration with the said rack bar and connected to the said roller to rotate the latter when the said rack bar is reciprocated, punching means disposed to coöperate with the paper for punching the latter and to be engaged by the lugs on said roller, and means for impressing predetermined indicia on the said paper prior to operation of said punching means.

4. In a recording and registering device, the combination of a reciprocatory rack bar, means for releasably locking the rack bar, punching means, a source of paper supply, means for training the paper in proximity to the said punching means, a rotatable roller, means for actuating the said punching means when the said roller is operated, and a train of gears in mesh with the said rack bar and connected to the said roller to rotate the latter when the said rack bar is reciprocated.

5. A recording and registering device comprising, in combination with a reciprocating rack bar, a source of paper supply, means for training the paper in a predetermined path, a rotatable roller having indicia provided thereon and adapted to be moved into proximity to the said path of the paper, means for rotating said roller to aline any of the said indicia with the surface of the paper, and means in mesh with said rack bar for pressing the paper sharply against the said indicia to form an intaglio of the indicia in the paper.

6. A recording and registering device comprising, in combination with a rack bar, a source of paper supply in a continuous strip, means for receiving and training the strip in a predetermined path, a plurality of punching elements adapted to contact with the paper at a predetermined point on the surface thereof, a striker, a rotatable disk having indicia provided on its marginal edge, means for rotating the disk to move any one of the said indicia into alinement with the said striker, means in mesh with the rack bar to rotate when the said rack bar is reciprocated, an actuating means associated with the said punching elements and striker and adapted to intermittently operate them upon the actuation of the said rack bar, and means connected to the said actuating means to take up the said strip of paper.

7. A recording and registering device comprising, in combination with a movable rack bar, a rotatable disk, means for locking the said rack bar, key operated means including a gear adapted to unlock the said means for locking the said rack bar, a train of gears actuated by the said rack bar, punching elements associated with the said disk, rotatable means for actuating the said punching elements, the said train of gears being connected to the said actuating means for operation of the punching elements when the key operated mechanism is actuated.

8. In a recording and registering device, the combination of a movable rack bar, a recording device including a rotatable disk, key operated means for imparting a rotary movement to the said disk, a source of paper supply in strip form, means for guiding the strip in a predetermined path in proximity to the said disk, the latter being provided with different indicia adapted to be moved into proximity to a certain predetermined point on the surface of the said strip, a striker, means for actuating said striker, said striker being positioned to press said paper against the disk at a point in alinement with the indicia thereon to form an intaglio of the indicia in the paper.

9. A registering and recording device comprising a movable rack bar, a supporting frame, a rotatable disk provided with indicia on its marginal edge, means supported by the said frame for rotating the said disk, locking means for the said rack bar, a sleeve supported by the frame and adapted for rotation to release the said locking means, and means associated with the said sleeve to impart movement to the said disk, a source of paper supply, means for training the said paper in a predetermined path, said actuating means for the disk including a push rod having a predetermined movement for ascertaining certain positions of the indicia on the said disk, and a striker disposed to contract with the paper at a point adjacent the fixed position of the said indicia on the disk.

10. In a recording and registering device, the combination of a movable rack bar, a frame, a rotatable sleeve supported by the frame, locking means for said rack bar including a second rack bar engageable with said sleeve to be actuated when the latter is rotated, recording means including a train of gears connected to the said second rack bar and adapted to be actuated thereby when the said rack bar is released, and key operated means to turn the said sleeve and permit actuation of the said locking bar.

11. A recording and registering device comprising a frame having a sleeve rotatably mounted therein, recording means rotatably mounted and including indicia adapted to be properly positioned at a predetermined point, means mounted in the sleeve and adapted to be operated for actuating said recording means, a striker, punching means positioned in proximity to the said recording means, a rotatable roller, means mounted on the roller and adapted to coöperate with the said punching means to actuate the latter when the roller is operated, a train of gearing connected to the said roller to actuate the latter, and a flexible strip interposed between the said recording means, striker and the said punching element, to receive the impression of the recording means when the said striker is actuated to flex the said flexible strip.

12. A recording and registering device comprising a frame a plurality of different characters, means for supporting and mounting the characters to travel in a predetermined path, a source of impressionable material, means for guiding the said material in a predetermined path whereby a portion of the surface of the material will travel in proximity to the said characters, a striker freely movable against the said material to press the latter against the said characters, a rotatable roller, means mounted on the roller to permit free rotation of the latter in one direction without actuating the said striker, the said means including a tongue adapted to be pressed when the roller is rotated in the opposite direction, said roller having lugs to operate the strikers.

13. A recording and registering device comprising a rotatable sleeve, a rack bar, locking means for the said rack bar, means mounted on the sleeve to release the said locking means, a train of gears having engagement with the said rack bar and operated when the rack bar is reciprocated, recording means associated with the said gearing and simultaneously operated with the rotation of the said sleeve, key operated means to cause operation of the said recording means, and a second locking means adapted for operation to release the first locking means for permitting operation of the said recording means.

14. A recording and registering device comprising a movable rack bar, means for locking the rack bar including a locking bar having a tongue releasably engaged with the teeth of the said rack bar, auxiliary locking means pivotally mounted, key operated recording mechanism, the said mechanism including a key having a portion engageable with the said auxiliary locking mechanism to release the said locking bar, and means actuated by the said key to remove the locking bar for permitting operation of the said rack bar.

LEONARD S. BALUTA.